(12) United States Patent
Betensky

(10) Patent No.: US 6,292,306 B1
(45) Date of Patent: Sep. 18, 2001

(54) TELECENTRIC ZOOM LENS SYSTEM FOR VIDEO BASED INSPECTION SYSTEM

(75) Inventor: Ellis Betensky, Toronto (CA)

(73) Assignee: Optical Gaging Products, Inc., Rochester, NY (US)

( * ) Notice: Subject to any disclaimer, the term of this patent is extended or adjusted under 35 U.S.C. 154(b) by 0 days.

(21) Appl. No.: 09/314,343

(22) Filed: May 19, 1999

(51) Int. Cl.⁷ .............................. G02B 13/22; G02B 7/02
(52) U.S. Cl. ............................. 359/663; 359/821
(58) Field of Search ..................... 359/663, 676, 359/679, 363, 368, 379–382, 821; 348/79–80, 86, 92, 125–126, 363

(56) References Cited

U.S. PATENT DOCUMENTS

| | | | |
|---|---|---|---|
| 5,619,031 | * | 4/1997 | Choate .............................. 250/201.2 |
| 5,668,665 | * | 9/1997 | Choate .............................. 359/663 |
| 5,745,236 | * | 4/1998 | Haga ..................... 356/600 |

\* cited by examiner

*Primary Examiner*—Jordan M. Schwartz
(74) *Attorney, Agent, or Firm*—Shlesinger, Fitzsimmons & Shlesinger

(57) ABSTRACT

A telecentric imaging lens system and video camera are mounted above a work support for reciprocation toward and away from an object positioned for inspection on the support. The system includes a lens barrel having therein a plurality of lenses and an adjustable iris diaphragm for projecting an image of an object from a stop opening in the diaphragm to an image inlet end of a zoom lens housing having an image outlet end connected to the camera to transmit the image of an inspected object to an image plane in the camera. The zoom lens housing has therein a plurality of movable zoom lens groups for projecting a magnified image of the object to the image plane in the camera; and the zoom lens groups are adjustable axially of the housing to alter the magnification of the image projected to the camera. A beamsplitter is mounted in the barrel and registers through an opening in the barrel with an external light source to direct light onto the surface of an inspected object, and to pass an image thereof to the zoom lens housing.

17 Claims, 2 Drawing Sheets

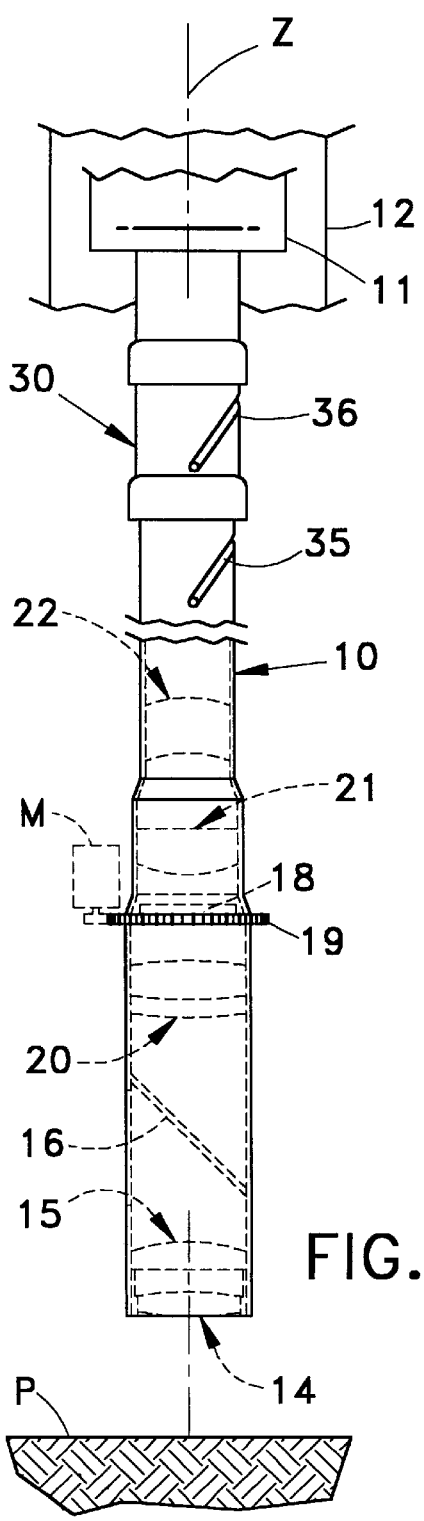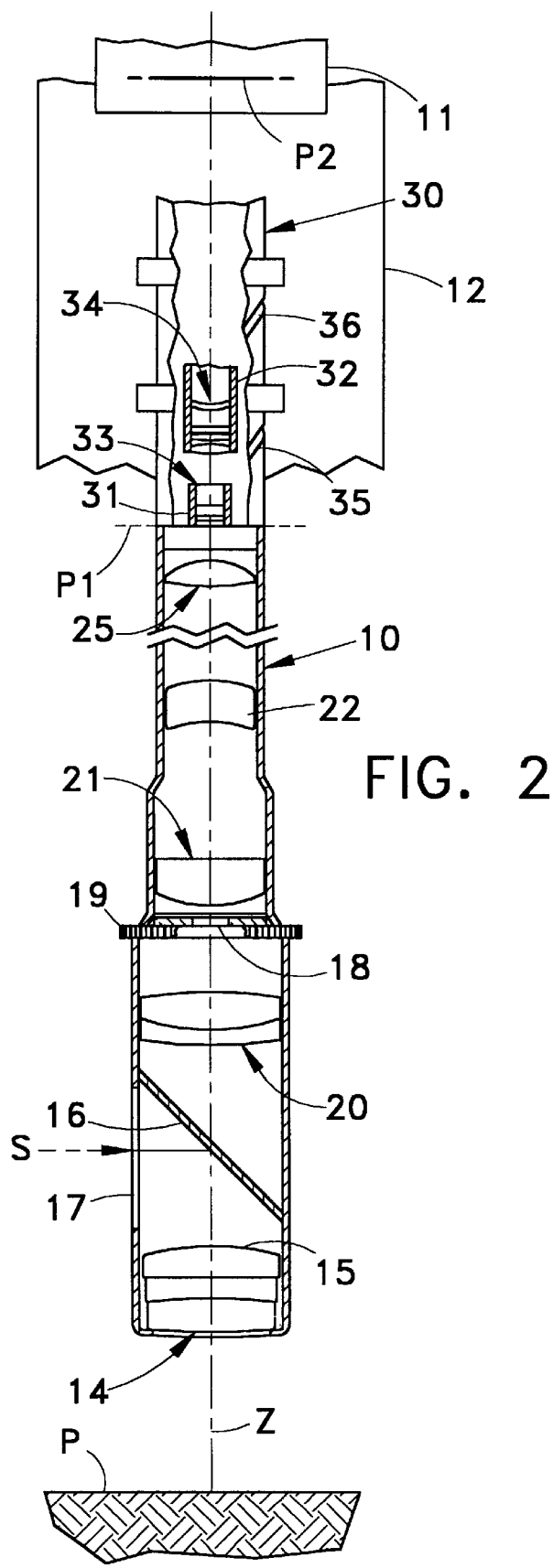

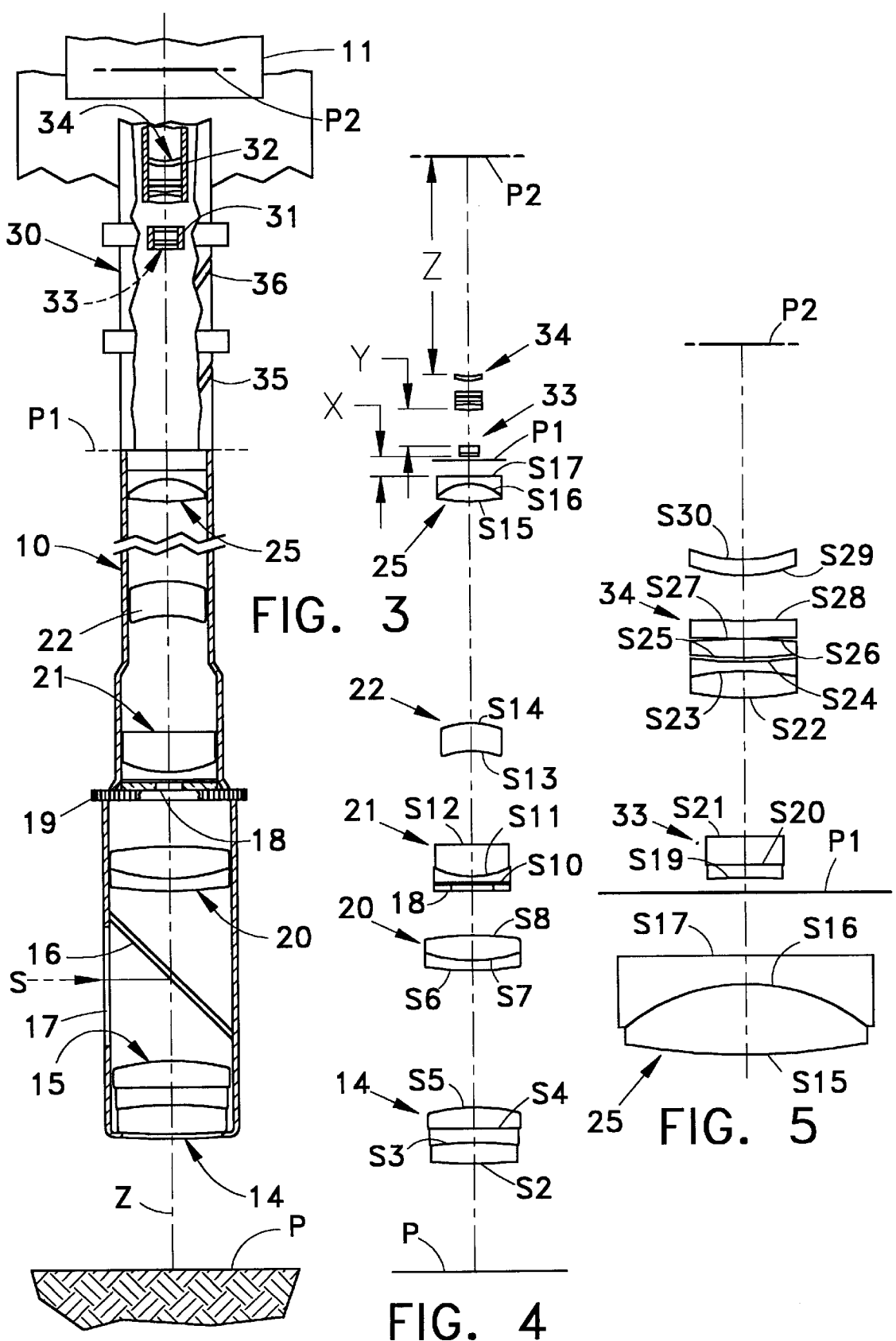

TELECENTRIC ZOOM LENS SYSTEM FOR VIDEO BASED INSPECTION SYSTEM

BACKGROUND OF THE INVENTION

This invention relates to a metrological apparatus, and more particularly to apparatus of the type employed for automated optical inspection of manufactured objects, particularly in regard to the determination of precise dimensional measurements of such objects. Even more particularly this invention relates to an improved variable magnification optical system and associated video camera for accurately performing computerized image analysis and dimensional measurements of such objects.

Metrological apparatus of the type described normally includes a support for the object upon which dimensional measurements are to be made, and some means for precisely moving either the object or the associated video camera which is employed for recording or displaying a magnified image of the object that is being inspected. Such apparatus in addition to being able to perform measurements in a horizontal or X-Y plane, also may include autofocus means for determining heights of the object in the Z direction normal to the X-Y plane. In this manner such apparatus is capable of producing a full, three-dimensional inspection of the object.

Heretofore, as described for example in U.S. Pat. No. 5,389,774, it has been customary normally to employ in a video inspection system of the type described a conventional zoom lens mechanism to vary focal length and to maintain focus. Typical such zoom lenses are not telecentric, so that the position of the object within the depth of focus significantly affects apparent size of the object, particularly at lower magnifications and at larger fields.

One object of this invention is to provide for an inspection system of the type described a telecentric zoom lens device that covers a broad range of magnifications, has a large collimated space for insertion of an illumination means, has large working distance, and allows for use with interchangeable infinity corrected objectives.

Another object of this invention is to provide a telecentric zoom lens device of the type described having an F-number or aperture which is intentionally nearly constant at the image, thereby presenting uniform intensity and resolution throughout the magnification range.

Other objects of the invention will be apparent hereinafter from the specification and recital of the appended claims, particularly when read in the light of the accompanying drawings.

SUMMARY OF THE INVENTION

The work to be inspected is positioned on the surface of a table beneath a series of imaging lenses that are secured to a system support that overlies the work. The lenses have an optical axis disposed vertically and includes a coaxial adjustable telecentric stop or iris diaphragm and two moving groups of lenses for performing magnification zooming, where these are controlled by cam and slot means as in conventional zoom lenses. The complete system may also include a substage collimator or illuminator to offer a silhouette image of the object, while a beamsplitter within the lens system can be used to inject surface inspection illumination in the opposing direction.

In addition, the lens systems support is mounted for vertical adjustment on a vertical slide, so that the entire assembly (the camera, the diaphragm, the imaging lens system, and the surface illuminator) can be moved as a unit vertically relative to the work, whereby magnification variation is achieved and focus maintained by cam actuated positioning of the lens groups within the zoom lens assembly, while the object plane can be relocated by moving the entire system thereon relative to the work. The lens system incorporates telecentricity and consistent precise image resolution so as to maximize measurement accuracy. This is accomplished through the use of the variable aperture of the iris diaphragm positioned at the back focus of the front objective lens. That lens serves in an optical relay to present an intermediate image to an optical zoom, which is a novel means for achieving improved performance in this class of apparatus.

THE DRAWINGS

FIG. 1 is a fragmentary front elevational view of variable magnification inspection apparatus and an associated zoom lens system therefore made according to one embodiment of this invention;

FIG. 2 is a slightly enlarged fragmentary axial section view through the barrel containing the zoom lens system, the system being illustrated in position to produce a high magnification of an inspected object;

FIG. 3 is a view similar to FIG. 2 but showing the lens system adjusted to produce a low magnification of an inspected object;

FIG. 4 is a view generally similar to that shown in FIG. 2, but eliminating the lens housings and camera and showing only the lenses to assist in identifying the surfaces thereof; and FIG. 5 is a greatly enlarged view of those lenses shown at the right end of FIG. 4 to enable identification of the surfaces of such lenses.

DETAILED DESCRIPTION OF THE PREFERRED EMBODIMENTS

This zoom lens design ranges from 0.8×F/25 to 8×F/2.5, with a constant F/20 at the image. The object plane and image plane are fixed throughout the zoom range, while two moving lens groups perform the magnification change and a telecentricly located iris diaphragm adjusts to maintain proper aperture. The major components of this system are presented below, in sequence proceeding from object to image.

Referring now to the drawings by numerals of reference, and first to FIG. 1, 10 denotes generally a lens barrel which registers at one end coaxially through a zoom lens housing 30 with the image inlet end of a video camera 11. Barrel 10, housing 30 and camera 11 are mounted on a plate 12 for reciprocation thereby toward and away from a work support or object plane P along the image axis Z of barrel 10. At its forward end barrel 10 has removably mounted therein an infinity corrected front objective lens assembly 14. In use the work support P, which may be employed with a substage collimated light source, is disposed to be located at the front focal point of assembly 14, which therefore would receive a silhouette image of an object. The lens assembly 14 is comprised of a cemented triplet lens and includes an aspheric surface 15, so as to provide sufficient aberration correction while presenting minimal objectionable stray light produced by lens surface reflections of the surface illumination. Another version of front objective lens assembly (not illustrated) is comprised at an achromatic quarter-wave retardation plate and an air space triplet lens, where polarizers in the surface illumination and imaging paths are used to control the objectionable reflections, following standard practices.

It is not essential that the front objective lens assembly 14 produce a collimated beam, although this permits the use of a plate beamsplitter without serious deleterious effects, or a beamsplitter cube could be employed. However, by having the front objective lens assembly 14 independently infinity corrected, various alternative commercially available similar objective lenses can also be accommodated.

Mounted in barrel 10 behind the front objective lens assembly 14 is a beamsplitter plate 16 which registers through an opening 17 in barrel 10 with external source S of surface illumination. Its aberration effects are minimized by virtue of the imaging collimation in this region, since the object is here effectively imaged at infinity. Plate 16 is inclined at 45º to the axis of barrel 10 and functions to direct illumination from source S onto the surface of an object on plane P that is being inspected, and passes an image of the object rearwardly in barrel 10.

Beyond the beamsplitter 16 is an adjustable iris diaphragm or telecentric stop 18, which is mounted in barrel 10 to serve as the telecentric stop. Diaphragm 18, which is connected to a gear 19 for adjustment thereby, is effectively located in this embodiment at the back focal point of the front objective lens assembly 14, although it may actually be located before, within, or beyond the next functional optical group.

The diaphragm 18 forms part of a re-imaging lens assembly which works in conjunction with the front objective lens assembly 14, as an optical relay, producing a somewhat magnified intermediate image. In this example, the re-imaging lens assembly includes in barrel 10 two lens doublets 20 and 21, and a singlet lens 22. Doublet 20 is located between the beamsplitter 16 and 10 the telecentric stop 18; and doublet 21 is located between the stop 18 and singlet 22. As usual, multiple elements are employed to achieve desired correction of optical aberrations.

There is an additional lens in barrel 10, in this case a doublet 25 which is axially spaced rearwardly of lens 22, and which serves as a field lens to focus on a first image plane P1 the image produced by the combined telecentric stop 18 and re-imaging lenses 20–22 for the following described zoom portion of the system, thus minimizing the diameters of the lens elements of the zoom portion.

At its inner end barrel 10 is connected coaxially to one end of a zoom lens housing 30 which may be of conventional design, and parts of which are shown fragmentarily. Adjustably mounted in housing 30 are two separate lens groups that are mounted in separate lens barrels 31 and 32, respectively. The lens group 33 in barrel 31 comprises a cemented doublet, while group 34 in barrel 32 comprises a doublet and three singlets. These two lens groups 33 and 34 project the image from the first image plane to the sensor P2 of the video camera 11 at a variable magnification, providing a 10:1 range in final magnification. The adjustment of these two lens groups 33 and 34 in housing 30 is controlled in conventional manner by cams that slide in slots 35 and 36, respectively, in housing 30 as in conventional zoom systems, and form no part of this invention and are therefore not illustrated in detail herein. When adjustment of the zoom lens groups 33 and 34 necessitates adjustment of the stop opening in the diaphragm 18, the gear 19 may be operated manually or by a motor M, such as shown in phantom by broken lines in FIG. 1.

The final element is the CCD video camera 11 for sensing the image, and may have its output applied to an associated computerized image analysis system.

In addition to the surface illuminator light source S that projects off the beamsplitter 16, there also may be a substage illumination system. It typically consists of a tungsten source and collimation lens, for purposes of providing proper illumination for such a telecentric system.

Referring to FIGS. 4 and 5, the surfaces of the various lenses shown in FIGS. 1 to 3 are identified by numerals S2, etc., and are further identified in the Lens Table, which is listed hereinafter. Referring first to FIGS. 4 and 5, and referring to successive lens surfaces beginning with the lens assembly 14, the surface 32 of the first lens in this assembly confronts the object plane P. The next successive surfaces in this lens assembly are denoted as S3, S4, and S5. Doublet 20 is denoted by surfaces 36, S7 and S8; doublet 21 is denoted by surfaces S10, S11 and S12; singlet 22 by surfaces S13 and S14; and doublet 25 by surfaces S15, S16 and S17. Referring to FIG. 5, doublet 33 is denoted by surfaces S19, S20 and S21, while the doublet of group 34 comprises the surfaces S22, S23 and S24. Surface 24 is slightly spaced from the confronting surface S25 of a singlet lens having its other surface S26 facing the surface S27 of a second singlet lens of group 34. The other surface S28 of this second singlet is disposed in spaced confronting relation to a surface S29 of the third singlet, the other surface S30 of which is disposed in spaced, confronting relation to the sensor P2 of the video camera 11.

Referring to the following Lens Table, the above-noted lens surfaces S2, etc. are listed in one column followed by an adjacent column in which the radius of each respective surface S2, etc. is listed in millimeters. In the third column the thickness of each lens is given in millimeters, and in the fourth and last column there is a listing of the type of glass from which each lens is made. In reading the Lens Table, it will be noted that each successive pair of lens surfaces defines a respective lens, the thickness of which and the glass from which it is made being listed in their respective columns, but medially and laterally of the space in the Table separating a respective pair of lens surfaces. Note for example in the Lens Table the space between the first pair of listed lens surfaces S2 and S3 registers laterally with the thickness (8mm.) of the lens and the particular glass O_S-FPL51) from which the lens is made.

LENS TABLE

| LENS SURFACES | SURFACE RADIUS IN MM. | LENS THICKNESS IN MM. | LENS GLASS |
|---|---|---|---|
| S2 | 121 | | |
| | | 8 | O_S-FPL51 |
| S3 | −52 | | |
| | | 5 | KZFSN5 |
| S4 | 1557 | | |
| | | 8 | O_S-FPL51 |
| S5 | −42.1 | | |
| S6 | 72.2 | | |
| | | 4 | KZFSN5 |
| S7 | 37.7 | | |
| | | 8.9 | O_S-FPL51 |
| S8 | −186 | | |
| S10 | −897 | | |
| | | 3 | KZFSN5 |
| S11 | 21.8 | | |
| | | 12 | O_S-BAH28 |
| S12 | 295 | | |
| S13 | −23.1 | | |
| | | 12 | LAK8 |
| S14 | −30.2 | | |

-continued

LENS TABLE

| LENS SURFACES | SURFACE RADIUS IN MM. | LENS THICKNESS IN MM. | LENS GLASS |
|---|---|---|---|
| S15 | 37.5 | | |
| | | 7 | LAK8 |
| S16 | −15.8 | | |
| | | 2 | SF53 |
| S17 | −159 | | |
| S19 | −15.5 | | |
| | | 1 | O_S LAL9 |
| S20 | 13.2 | | |
| | | 2.5 | O_S TIH53 |
| S21 | −262 | | |
| S22 | 15.1 | | |
| | | 2.5 | O_S-LAH66 |
| S23 | −16.9 | | |
| | | 1 | O_S-TIM28 |
| S24 | 10.5 | | |
| S25 | 18 | | |
| | | 2 | O_S-LAL59 |
| S26 | −67.6 | | |
| S27 | 15.14 | | |
| | | 2 | O_S-LAL9 |
| S28 | 42.8 | | |
| S29 | 10.9 | | |
| | | 1 | FK5 |
| S30 | 9.6 | | |

As noted above, the zoom lens design of this application ranges from 0.8×F/25 to 8×F/2.5, and with a constant F/20 at the image. Once the mounting plate 12 has been moved to a desired position, the zoom lens groups 33 and 34, and the aperture in the diaphragm or telecentric stop 18 can be adjusted to achieve different magnifications. As shown by the Magnification Table below, for different magnifications the diameter of the opening in the diaphragm 18 (telecentric stop opening) changes as does the distance between the groups of lenses and the final image plane P2, as shown for example in FIG. 4. In that Fig. X represents the distance in millimeters separating the lens groups 25 and 33; Y represents the distance separating the lens groups 33 and 34, and Z represents in millimeters the distance separating lens group 34 from the final image plane.

MAGNIFICATION TABLE

| Magnification | Stop. Diam. | X mm. | Y mm. | Z mm |
|---|---|---|---|---|
| .8× | 2.6 | 58.8 | 3.9 | 25.2 |
| 1.8× | 6.0 | 44.0 | .5 | 43.4 |
| 4.8× | 16.0 | 16.6 | 4.6 | 66.7 |
| 8.0× | 27.0 | 1.3 | 12.9 | 73.7 |

Referring to the above chart, it will be noted that for the smallest magnification at 0.8× the stop diameter is 2.6 mm., the distance X is 58.8 mm., the distance Y is 3.9 mm. and the distance Z is 25.2 mm. On the other hand for the largest magnification 8.0×, the stop diameter is 27 mm., X is 1.3 mm, Y is 12.9 mm., and Z is 73.7 mm. In the drawings FIGS. 2 and 4 correspond to the high magnification, while FIG. 3 corresponds to the low magnification.

From the foregoing it will be apparent that the present invention provides a novel telecentric zoom lens mechanism that provides for improved performance, not just for telecentricity, but also for image quality, particularly chromatic aberrations. Also, the invention eliminates the need for employing a large working distance which dictates lens diameters, and thus exacerbates the problem of telecentricity, and covers not only a broad range of magnifications, but also is designed to permit the insertion in a lens system of illumination which can be utilized to illuminate the upper surface of the object being inspected. Moreover, with this apparatus the zoom mechanism is telecentric, so that it provides a consistent and precise image resolution which functions to maximize the measurement accuracy of an object being inspected.

While this invention has been illustrated and described in connection with only certain embodiments thereof, it will be apparent to one skilled in the art that it is capable of still further modification. For example the powers of the fixed lens groups could be changed to give a different 10:1 zoom that is still telecentric, and the motions of the lens groups could be controlled by means other than cams. Also, the rear group 34 could be changed or an additional rear group could be added to accommodate a different image sensor size without departing from the invention. Moreover, this application is intended to cover any such modifications as may fall within the scope of one skilled in the art or the appended claims.

What is claimed is:

1. In a video inspection apparatus of the type including a video camera mounted on a slide above a work support for reciprocation vertically by the slide toward and away from an object positioned for inspection on said support, a telecentric zoom lens system mounted on the slide between the said camera and work support, and comprising a lens barrel having in one end thereof an objective lens assembly positioned to have the front focal point thereof registering with an inspected object on the support, thereby to project an image of the inspected object coaxially of said barrel toward the opposite end thereof, an adjustable iris diaphragm mounted in said barrel rearwardly of said objective lens assembly and having therein an adjustable telecentric stop opening disposed coaxially of said barrel and registering with the rear focal point of said objective lens assembly, means in said barrel for projecting said image of an object from said stop opening to a first image plane positioned adjacent said opposite end of said barrel, and a zoom lens housing having an image inlet end connected to said opposite end of said lens barrel coaxially thereof, and having an image outlet end connected to said camera to transmit said image of an inspected object to an image plane in said camera, said housing having therein a plurality of movable zoom lens groups for projecting a magnified image of said object from said first image plane to said image plane in said camera, and said zoom lens groups being adjustable axially of said housing to alter the magnification of said image projected to said camera.

2. Apparatus of the type defined in claim 1, including a beamsplitter mounted in said barrel between said objective lens assembly and said diaphragm and registering through an opening in said barrel with a light source located externally of said housing, said beam splitter being operative to direct illumination from said source through said lens assembly and onto the surface of the inspected object.

3. Apparatus of the type defined in claim 2, wherein said objective lens assembly comprises a cemented triplet lens having an aspheric surface facing said support, and operative to transmit a collimated beam toward said beam splitter.

4. Apparatus of the type defined in claim 2, wherein said means comprises a reimaging lens assembly in said barrel, including a first lens doublet positioned between said beamsplitter and said diaphragm, a second lens doublet positioned between said diaphragm and said first image plane, and a lens singlet positioned between said second lens doublet and said first image plane.

5. Apparatus of the type defined in claim 4 including a field lens mounted in said barrel between said lens singlet and said first image plane and operative to focus on said first image plane said image of the inspected object.

6. Apparatus as defined in claim 5, wherein said field lens comprises a lens doublet.

7. Apparatus as defined in claim 1, wherein zoom lens groups upon adjustment in said housing comprise a negative moving group confronting said first image plane, and a positive moving group confronting said image plane in said camera.

8. Apparatus as defined in claim 1, including means connected to said iris diaphragm and operable to alter the diameter of said stop opening upon adjustment of said zoom lens groups to alter the magnification of said image.

9. Apparatus as defined in claim 1, wherein said zoom lens groups are adjustable to alter said magnification of said image in the range of from 0.8×F/25 to 8.0×F/2.5.

10. Apparatus as defined in claim 9, wherein the diameter of said stop opening ranges from 2.6 mm. for the lowest magnification of said image to 27.0 mm. for the highest magnification thereof.

11. Apparatus as defined in claim 1, wherein the surface radii of the lenses in said zoom lens groups range from +42.8 to −262.0 mm.

12. Apparatus as defined in claim 4, wherein the surface radii of the lenses in said reimaging lens assembly range from +295 mm. to −897 mm.

13. Apparatus as defined in claim 1, wherein the surface radii of the lenses in said objective lens assembly range from +1557 mm. to −52 mm.

14. An imaging lens system for transmitting to the image inlet of a video camera the image of a workpiece mounted on a support in spaced relation to the camera, comprising a lens barrel having one end thereof disposed to be placed in spaced, confronting relation to said support, a zoom lens housing having an image inlet end connected coaxially to the opposite end of said barrel, and having an image outlet end disposed to be placed in registry with the image inlet end of said camera, an iris diaphragm mounted in said barrel intermediate the ends thereof and having therein an adjustable telecentric stop opening disposed coaxially of said barrel, a plurality of lenses secured in said barrel and operative to project an image of a workpiece on said support through said stop opening and into said image inlet end of said zoom lens housing, and a plurality of movable zoom lens groups in said housing operative to magnify and project said image of the workpiece to the image inlet of said camera, said zoom lens groups being adjustable axially of said housing to alter the magnification of said image.

15. An imaging lens system as defined in claim 14, wherein said barrel has intermediate its ends an opening in the annular wall thereof; and a beamsplitter is mounted in said barrel to register through said opening with a light source disposed externally of said barrel, and operative to direct light from said source onto the surface of said workpiece, and to transmit an image thereof toward the image inlet end of said housing.

16. An imaging lens system as defined in claim 14, wherein said plurality of lenses in said barrel include, an objective lens assembly mounted in said one end of said barrel, and a reimaging lens assembly interposed between said iris diaphragm and said opposite end of said barrel and operative to project said image onto an image plane adjacent said opposite end of said barrel.

17. An imaging lens system as defined in claim 14, including means for adjusting said zoom lens groups selectively to increase and decrease the magnification of said image as it traverses said housing, and means for adjusting the diameter of said stop opening to increase said diameter when the magnification of said image is increased and for reducing said diameter when said magnification is decreased.

* * * * *